Nov. 3, 1953 G. E. PARKER 2,657,918
DUPLEX SPEED REGULATOR
Filed Sept. 14, 1950 2 Sheets-Sheet 1

INVENTOR
George E. Parker
By Carlson, Pilzner, Hubbard & Wolfe
ATTORNEY

Nov. 3, 1953  G. E. PARKER  2,657,918
DUPLEX SPEED REGULATOR
Filed Sept. 14, 1950  2 Sheets-Sheet 2
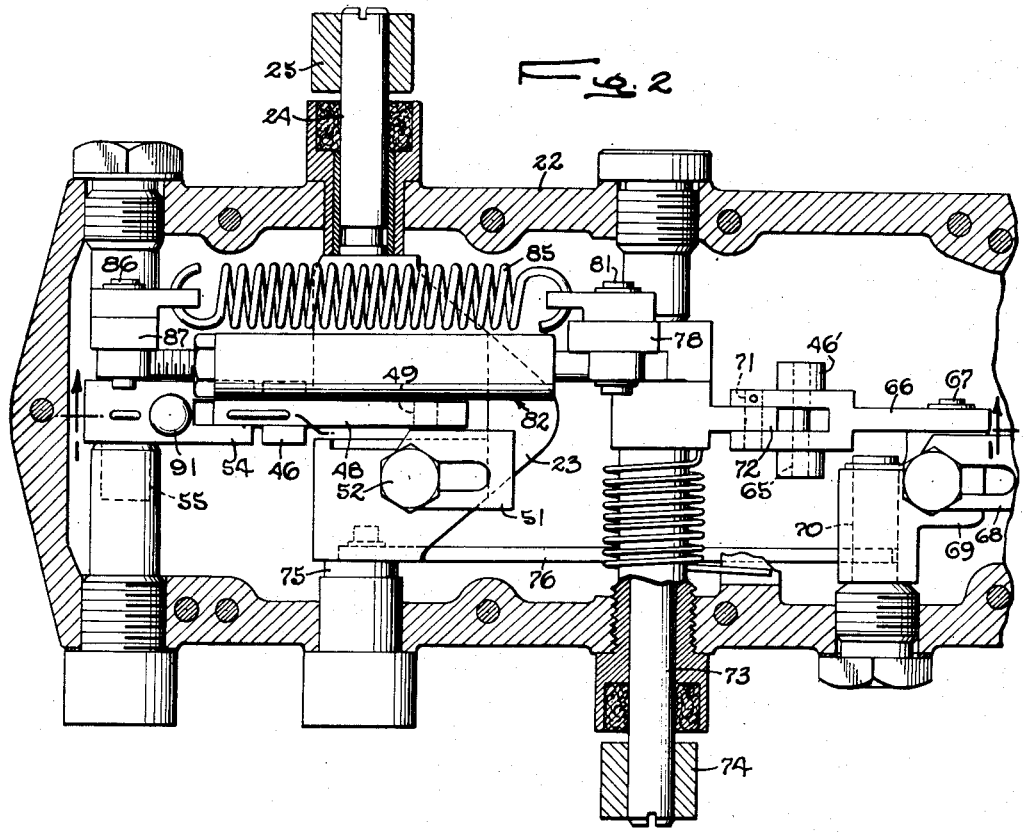
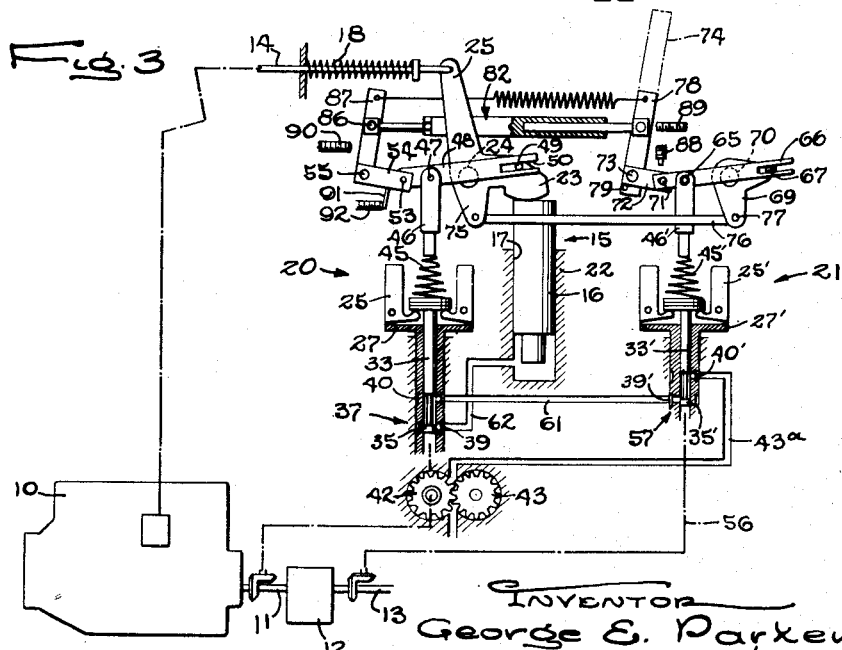
INVENTOR
George E. Parker
By Carlson, Pitzner, Hubbard & Wolfe
ATTORNEY Patented Nov. 3, 1953

2,657,918

UNITED STATES PATENT OFFICE 2,657,918

DUPLEX SPEED REGULATOR

George E. Parker, Rockford, Ill., assignor to Woodward Governor Company, Rockford, Ill., a corporation of Illinois Application September 14, 1950, Serial No. 184,781

11 Claims. (Cl. 264—7)

This invention relates to a speed regulator of the type in which two speed governors separately driven by a prime mover and the output of a variable ratio transmission act jointly to control the action of a power servo in positioning a regulating member controlling the delivery of an energy medium to the prime mover.

One object is to provide a duplex speed regulator of the above character in which the control devices of the two governors are arranged to act serially in controlling the energization of the servo.

Another object is to provide a novel mechanism for adjusting the speed settings of the governors in the proper sequence.

A further object is to limit the action of the transmission actuated governor in a novel manner so as to prevent shut-down of the prime mover under certain conditions.

Other objects and advantages of the invention will become apparent from the following detailed description taken in connection with the accompanying drawings, in which Figure 1 is a vertical sectional view of a speed regulator embodying the present invention, the section being taken along the line 1—1 of Fig. 2.

Fig. 2 is a section taken along the line 2—2 of Fig. 1.

Fig. 3 is a schematic view of a modified form of the regulator as applied to a prime mover-torque converter combination.

Figure 1:
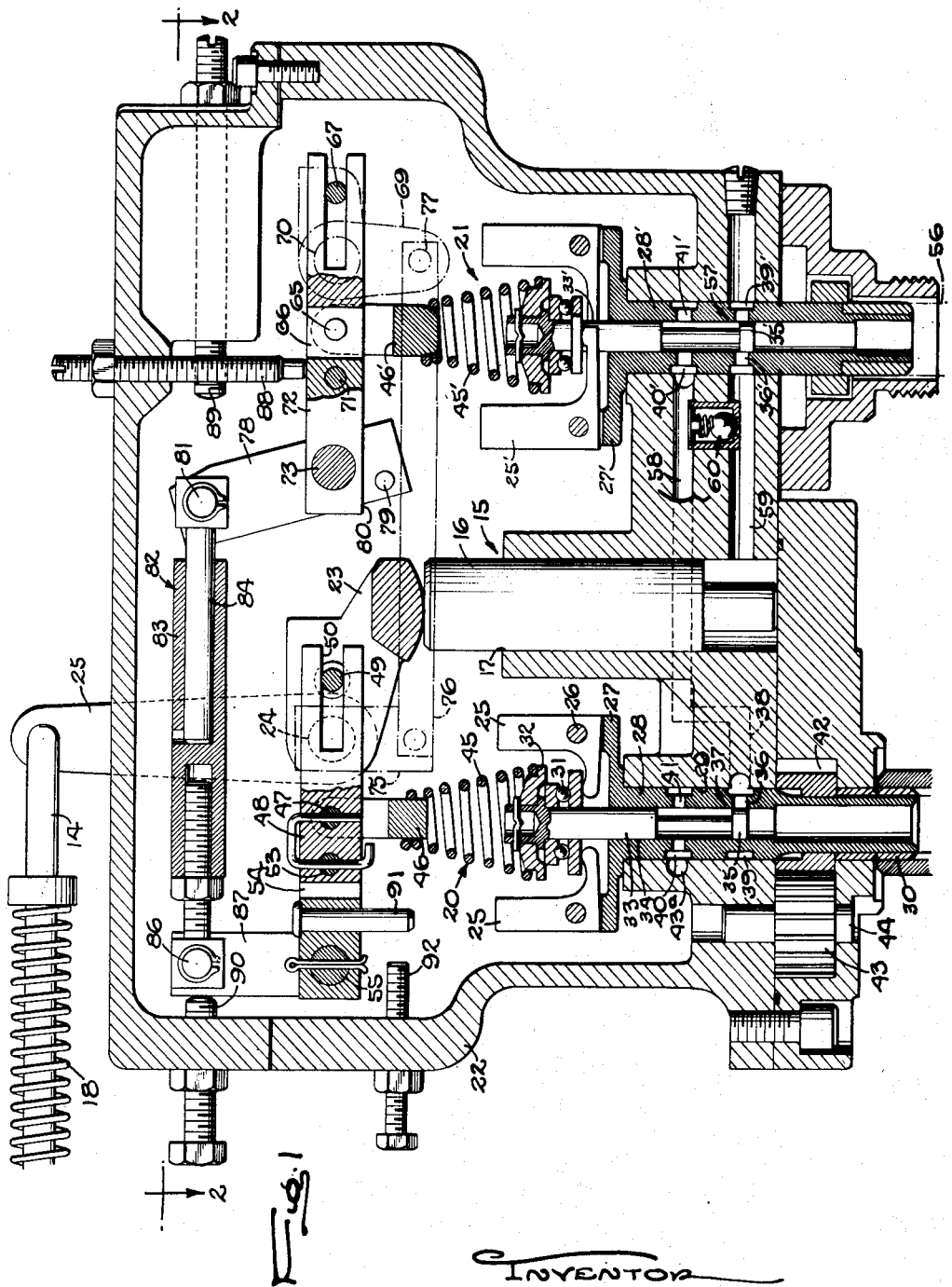

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

In the drawings, the invention is shown incorporated in a duplex governor for controlling the supply of fuel to a prime mover or internal combustion engine 10 whose shaft 11 is coupled to the input shaft of a so-called torque converter 12 having an output shaft 13. The torque converter may be of the fluid type and adapted to transmit the motion of the shaft 13 at a ratio which varies automatically with changes in the load on this shaft.

To vary the fuel supply to the engine, the fuel rod 14 thereof is arranged to be actuated by a power servo 15 which as shown may comprise a piston 16 slidable in a cylinder 17 and urged in the fuel-decreasing direction by a spring 18. Energization of the servo or the flow of pressure fluid to and from the cylinder 17 thereof is controlled by the joint action of the two speed-sensing devices or governors 20 and 21 respectively driven in unison with the prime mover shaft 11 and the output shaft 13 of the torque converter. Herein, both governors are housed in a casing 22 also containing the servo cylinder 17 from which the piston 16 projects upwardly and bears at its upper end against an arm 23 fast on a shaft 24. The latter is journaled in and projects outwardly from the casing and carries an arm 25 connected to the fuel rod linkage 14.

Considering first the governor 20, flyballs 25 are pivoted at 26 on a ball head 27 fast on the upper end of a sleeve 28 journaled in a bore 29 of the casing and splined at its lower end 30 for connection with the engine shaft 11. Horizontal arms on the flyballs bear upwardly against the lower race ring of an antifriction thrust bearing 31 whose upper ring abuts against a flange 32 on a rod 33 having an upper elongated land 34 which reciprocates in the bore of the sleeve 28. At its lower end, the rod 33 carries a land 35 which cooperates with ports 36 through the sleeve to form a valve 37.

The valve 37 constitutes the control device of the governor 20 and operates to regulate the flow of pressure fluid or oil to and from the lower end of the servo cylinder 17 through a passage 38. One end of the latter opens into a groove 39 extending around the sleeve 28 and communicating with the ports 36. When the land is raised above the ports in response to a speed increase above the speed setting of the governor 20, oil is permitted to flow from the cylinder 17 out through the lower end of the sleeve 28. Lowering of the land below the neutral position shown in Fig. 1 permits pressure fluid delivered through a sleeve groove 40 and ports 41 to flow toward the servo through the ports 36 and the groove 39.

Fluid at a substantially constant pressure may be supplied to the groove 40 by a pump comprising gears 42 and 43 in a recess formed in the casing 22 and having inlet and outlet openings communicating respectively with a sump within the casing and with a passage 43a leading to the groove 40. One gear 43 rotates on a stud 44 while the other gear is splined on the lower end portion of the sleeve 28.

The tendency of the flyballs 25 to move outwardly and lift the valve land 35 is counteracted by a speeder spring 45 of the compression type acting between the upper end of the valve rod 33 and a yoke 46 depending from a pivot pin 47 on a lever 48 and anchored in the upper end of the speeder spring coil. The lever 48 is disposed horizontally, and, for a purpose to appear later, is fulcrumed on a pin 49 which projects through a slot 50 in the lever and is mounted on the servo actuated arm 23 through the medium of a slotted bracket 51 adjustable along the top of the arm and clamped to the latter by a screw 52. The other end of the lever 48 is pivotally connected by a pin 53 to the forked free end of a bell crank arm 54 fixed to a rockshaft 55 which is journaled at opposite ends in the walls of the casing 22. Rocking of the shaft 55 clockwise as viewed in Fig. 1 swings the lever 48 about the fulcrum 49 and compresses the speeder spring 45 thereby increasing the speed setting of the governor 20 that is, the speed of the engine at which the land 35 covers the ports 36.

The governor 21 is of the same general construction as the governor 20, and the corresponding parts are indicated by similar but primed reference numerals. The drive sleeve 28' of this governor is coupled at its lower end to a suitable drive connection 56 rotatable with the output shaft 13 of the torque converter 12. The control device of this governor is a valve 57 formed by the land 35' and coacting sleeve ports 36'. When the speed of the torque converter shaft 13 rises above the speed setting of the governor 21 as determined by the stress of the speeder spring 45', the land 35' will be raised above the ports 36' thereby opening the valve 57 to pass fluid to the drain down through the valve sleeve 28'. At lower speeds, the land 35' will be lowered beyond the neutral position to allow fluid from the pressure source to pass to the servo cylinder.

To enable the two governors 20 and 21 to act jointly in controlling the energization of the servo 15, the two control devices or valves 37 and 57 are connected in series relation. In the form shown in Fig. 1, the pressure fluid from the pump flows first through the valve 37 and then through the valve 57. For this purpose, the valve groove 39 communicates through a passage 58 with the groove 40' and the groove 39' around the valve 57 is connected to the lower end of the servo cylinder 17 by a passage 59. Thus, high pressure fluid may flow to the servo cylinder when both of the valve lands 35 and 35' are lowered below their associated ports 36 and 36'. Conversely, fluid may drain from the servo cylinder when both valve lands are raised above the neutral or valve closed position. Under certain conditions, as when the valve 57 is closed and the engine governor 20 is calling for less fuel, it is desirable to by-pass the valve 57 and allow fluid to flow from the servo cylinder directly to the drain through the valve 37. This is accomplished through the provision of a spring loaded check valve 60 interposed between the passages 58 and 59 and arranged to allow fluid from the cylinder 17 to escape directly to the passage 58.

A modified and preferred series connection of the two valves is shown in Fig. 3 wherein the outlet 43ᵃ from the fluid pump 42, 43 leads to the groove 40' leading to the valve 57 through which the pressure fluid flows first. The groove 39' surrounding this valve communicates through a passage 61 with the groove 40 of the governor 20. The valve outlet 39 of the latter is connected to the servo cylinder 17 by a passage 62. With this arrangement, fluid may be drained from the servo whenever the land 35 alone is raised above its neutral position or, if the land 35 is lowered, the drainage may be out through the valve 57 of the governor 21. The lands of both governors must be lowered below neutral position to permit pressure fluid to flow from the pump into the servo cylinder, the same as in the form shown in Fig. 1.

The speed adjusting yoke 46' of the governor 21 is pivoted at 65 on a horizontal lever 66 forked at one end and straddling a fulcrum pin 67 which is supported on a slotted plate 68 adjustably clamped to a rocker arm 69 journaled on a stud 70 which projects inwardly from the wall of the casing. The other end of the lever 66 is forked and pivotally connected by a pin 71 to the free end of an arm 72 loose on a rockshaft 73 which is journaled in the casing walls with one end projecting outwardly and carrying the main speed adjusting arm 74 of the two governors. As in the case of the engine governor 20, the stress of the speeder spring 45' and therefore the setting of the torque converter governor 21 will be increased when the lever 72 is rocked clockwise as viewed in Fig. 1.

Proper correlation of the two governors 20 and 21 in their joint control of the single servo 15 is achieved by imparting to both governors a speed droop characteristic which differs in magnitude in the different governors but which is derived from the motion of the single servo. To this end, the servo motion is transmitted back to each governor and thereby used to vary the stressing of the speeder spring thereof progressively as the servo piston moves back and forth. The restoring connection for the engine actuated governor 20 is formed by the speed adjusting lever 48 simply by mounting the fulcrum pin 49 as described above directly on the rocker arm 23 of the servo 15 and in a position such that the upward or fuel-increasing movement of the servo piston 16 will swing the lever 48 in a direction to reduce the stress of the speeder spring 45. In this motion, the pin 53 at the end of the manually operable speed adjusting arm 54 acts as the fulcrum for the lever 48. Also, to enable the amount of the speed droop thus imparted to the governor 20 to be varied in magnitude, the fulcrum pin 49 is adjustably mounted as above described so that it may be shifted to different positions along the forked end of the lever 48 thus varying the ratio of transmission of the restoring or speed droop producing motion.

To impart speed droop to the torque converter governor 21, the servo motion is transmitted through a linkage including a depending arm 75 fast on the servo actuated fuel control shaft 24 and connected at its free end to one end of a link 76. The other end of the latter is pivoted at 77 on the lower end of the bell crank 69 which is swingable about the fixed pivot 70 to correspondingly swing the lever 66. By adjusting the fulcrum pin 67 along the lever 66, the ratio of the lever is changed and the magnitude of the speed droop of the governor 21 varied correspondingly.

Provision is also made for effecting speed adjustment of both of the governors 20 and 21 by manipulation of a single manually operable member such as the arm 74 which as described above is fast on the outer end of the rockshaft 73. Within the casing, an upwardly projecting lever 78 is fast on the shaft 73 and at its lower end has a lost motion connection with the speed adjusting lever 72 for the governor 21. This connection is formed by a laterally projecting pin 79 which, after a predetermined clockwise swinging of the lever 78, engages the under side of the lever 72 at a point 80 and, in the further movement of the lever, rocks the lever 72 about the shaft 73 to increase the compression of the speeder spring 45'.

The upper end of the lever 78 is pivotally connected at 81 to one end of a longitudinally extensible link 82 formed by telescoping parts 83 and 84 and normally contracted by a tension spring 85. The other end of the link 82 is pivoted at 86 on the upper end of an arm 87 upstanding from and fast on the speed adjusting rockshaft 55 above described of the governor 20.

The low speed setting of the torque converter governor 21 is determined by an adjustable stop 88 threading through the cover of the casing 22 and engageable at its inner end with the lever 72. A similar screw 89 is positioned at its inner end to engage with the end of the lever 78 and limit the speed-increasing movement of the lever 72 after the slack in the lost motion connection between the levers 72 and 78 has been taken up. A screw 90 engageable with the other end of the link 82 limits the low speed setting of the engine governor 20. The high speed setting of the latter governor is limited by engagement of a pin 91 on the lever 54 with the inner end of a screw 92.

By arranging the serially connected valves 37 and 57 in the sequence shown in Fig. 3, the check valve 60 above referred to may be omitted, and the valve 37 may, by virtue of its double action, perform the supplemental function of permitting the escape of pressure fluid from the servo independently of the prevailing position of the valve 57. Thus, pressure fluid may flow out of the servo to the drain when the land 35 of the valve 37 is raised above the port 36 irrespective of the position of the land 35' of the other valve 57. Also, if the land 35 is lowered below the neutral position by virtue of the engine speed being below the prevailing speed setting of the governor 20, fluid may be released from the servo by the valve 57 alone, that is, by raising of its land 35' above neutral in response to an increase in the speed of the shaft 13 above the prevailing speed setting of the governor 21.

With the series connections above described it will be apparent that while the two governors act jointly in controlling the energization of the servo, the control by either one may be superior to that of the other as determined by the prevailing speed settings, the governor having the lower setting exerting the predominating controlling action.

*Operation*

Let it be assumed that the governors 20 and 21 driven by the idling engine and torque converter shafts as above described are adjusted for the minimum speeds or rates of fuel flow with the governor 21 set at a somewhat higher fuel rate than the engine governor 20. The parts will then be positioned as shown in Fig. 1, the link 82 then being collapsed and the pin 79 being spaced from the lever 72. At the same time, the servo piston 17 will be in its lowermost position and the valve 57 will be open due to the higher setting of the governor 21.

As the adjusting arm 74 is swung clockwise, the link 82 will be held collapsed by the spring 85 and the arm 87 will be swung away from the stop 90 to increase the speed setting of the governor 20. As shown in Fig. 3, this opens the valve 37 against the action of the flyballs 25 admitting pressure fluid to the servo through the then open valve 57 to correspondingly increase the fuel flow and engine speed. If there is no load on the torque converter, the engine, operating at the increased speed, may increase the speed of the output shaft 13 above the minimum speed setting of the governor 21. The latter then exercises a superior control over the servo 15 by raising the land 35' above the port 36' and allowing pressure fluid to escape out of the cylinder 17 thus limiting the extent of fuel-increasing movement of the servo.

On the other hand, if a substantial load is imposed on the shaft 13, the increase in the fuel supply and engine torque may not be sufficient to pick up the load and increase the speed of the output shaft above the minimum setting of the governor 21. Thus, the fuel supply to the engine may be increased further without bringing the governor 21 into action. If the load is sufficiently heavy, the speed setting of the engine governor may be increased by further clockwise swinging of the hand lever 74 until the projection 91 on the lever 54 comes against the stop 92, the engine actuated governor then being set for its maximum speed. At this time, the lost motion between the adjusting linkage and the lever 72 will have been taken up, and further clockwise turning of the hand lever 74 will be permitted by extension of the link 82 and will result in compression of the speeder spring 45' to correspondingly increase the speed setting of the governor 21, or, in other words, the speed at which it is desired to maintain rotation of the output shaft 13.

The governor 21, now being in exclusive control of the servo, except when the engine speed exceeds the speed setting of the governor 20 opens and closes the valve 57 as the speed of the shaft 13 rises above or falls below the prevailing speed setting. If, for example, the speed rises above such setting, the release of fluid from the servo cylinder by raising of the land 35' will reduce the fuel supply and the engine speed may fall below the maximum speed for which the governor 21 is then set. As a result of such automatic control action together with the automatic response of the torque converter 12 to load changes, the speed of the output shaft 13 will remain substantially constant and at the selected setting of the governor 21 in spite of changes in the load up to the value capable of being handled by the engine when operating at its maximum speed. Thus, a drag line or shovel driven from the shaft 13 may be moved at constant speed in spite of variations in loading and as a result the capacity of the machine may be increased.

Now, if the speed setting of the governor 21 is reduced to the minimum value determined by the stop 88 and the setting of the governor 20 is reduced below the value required to maintain the minimum speed of the output shaft 13, control of the servo 15 is returned to the engine actuated governor 20. Under this condition, it is possible, by adjustment of the governor 20, to cut down the fuel delivery sufficiently to just balance the torque required to hold the load stationary. Such action is often desirable in material loading and unloading operations.

It will be apparent from the foregoing that with the duplex control described above, the engine fuel supply may be controlled exclusively either by the action of the engine actuated governor 20 or by the governor 21 or by the joint action of the two governors. At any instant, the governor in control is the one whose prevailing speed setting is the lower. Since the speed adjustments of both governors are within the control of the operator, the combined engine and torque converter unit may be adapted for automatic operation under a larger number of operating conditions than has been possible heretofore. Moreover, the operation of the automatic control, whether by one of the governors or by both, is inherently stable by virtue of the drooping characteristics imparted to both governors by the restoring connections described above.

I claim as my invention:

1. A duplex governor having, in combination, a fluid pressure servo having a piston element movable back and forth in accordance with pressure changes in the servo, means providing a source of fluid under pressure, first and second valves directly controlling the flow of fluid from said source to said servo and arranged in series with the second valve adapted to release fluid from the servo independently of the position of the first valve, a speed-sensing device adapted to be driven from one source of rotary power and operable to actuate said second valve and vary the energization of said servo in accordance with detected speed changes, a second speed-sensing device adapted to be driven from a separate source of rotary power and operable to open and close said first valve in accordance with detected changes, a connection between said piston element and said first device for varying the speed setting of the device progressively with changes in the position of the element, and a similar connection between said second speed-sensing device and said element to vary the setting thereof progressively with changes in the element position.

2. Speed regulating apparatus having, in combination, a fluid pressure servo having a movable piston element, means providing a source of pressure fluid, first and second double acting valves connected in series relation and acting to directly regulate the flow of pressure fluid from said source to said servo and thereby variably position said piston element, a speed sensing device for actuating said first valve adapted to be driven from one source of rotary power and having a selectively movable speed adjusting member, a second speed sensing device for actuating said second valve adapted to be driven from a separate source of rotary power and having a selectively movable speed adjusting member, and valve means controlled by the action of said first mentioned device to release fluid from said servo independently of the condition of said second valve.

3. Speed regulating apparatus having, in combination, a fluid pressure servo having a movable driven element, two control devices interconnected in series relation and acting jointly to directly regulate the increase in energization of said servo and thereby variably position said element, a speed senser for actuating one of said control devices adapted to be driven from one source of rotary power and having a selectively movable speed adjusting member, a second speed senser for actuating the other of said control devices adapted to be driven from a separate source of rotary power and having a selectively movable speed adjusting member, and means coacting with one of said devices to control the decrease in the energization of the servo independently of the prevailing condition of the other device.

4. Speed regulating apparatus having, in combination, a power actuated servo having a movable element, independently operable control devices interconnected in series relation and acting jointly to directly regulate the increase in energization of said servo and thereby variably position said servo element, a speed governor for actuating one of said control devices and adapted to be driven from one source of rotary power, a second speed governor for actuating the other of said devices and adapted to be driven from a separate source of rotary power, mechanisms individually operable to impart speed drooping characteristics to the respective governors, and connections operable to actuate both of said speed droop mechanisms in accordance with the changing position of said servo element.

5. A duplex governor having, in combination, a fluid pressure servo, means providing a source of fluid under pressure first and second valves, a speed-sensing device actuating said first valve and driven from one source of rotary power, said device having a member selectively adjustable to vary the speed setting of the device, an independently driven speed sensing device for actuating said other valve having a selectively adjustable speed setting member, means by which the settings of said first and second members may be changed successively to increase the speed settings of said first and second devices, and a fluid passage extending from said fluid source to the servo and including in series relation said second valve and the first valve.

6. A duplex governor having, in combination, a fluid pressure servo, a fluid pressure source, first and second valves, a speed-sensing device actuating said first valve and driven from one source of rotary power, a second independently driven speed sensing device for actuating said second valve, means defining a fluid passage extending from said source to said servo and having said first and second valves interposed therein in series relation, and a by-passage including an automatic check valve interposed between said servo and the outlet of said first valve and operable to permit the escape of fluid out of said servo directly through said first valve.

7. Speed regulating apparatus having, in combination, a fluid pressure servo having a movable driven element, two control devices coacting jointly to control the energization of said servo and thereby variably position said element according to the combined positions of the two devices, a speed senser for actuating one of said control devices adapted to be driven from one source of rotary power and having a selectively movable speed adjusting member, a second speed senser for actuating the other of said control devices adapted to be driven from a separate source of rotary power and having a selectively movable speed adjusting member, a member manually movable in one direction away from an idle position to first increase the speed setting of said first speed senser progressively to a predetermined value while the setting of the other speed senser remains unchanged and then, in the continued movement of the member, to increase the speed setting of the other speed senser while retaining the predetermined speed setting of the first speed senser, and individually and independently adjustable stops determining the minimum speed settings of said two speed sensers.

8. A speed regulator of the character described having, in combination, a power actuated servo having a movable driven part adapted for connection with the energy controller of a prime mover, two speed governors adapted to be driven from individual sources of rotary power and each having an adjusting member movable selectively to different positions to vary the speed setting of the governor, spaced stops limiting the movement of one of said members through a range between low and high speed positions, a stop limiting the movement of the other of said members away from a low position, control devices actuated by the respective governors and acting jointly to control the energization of said servo and thereby vary the position of said driven part, a single manually movable element selectively movable through a range corresponding to the combined ranges of movement of said two members, a normally contracted yieldably extensible linkage connection between said element and one of said members and operable to move one of said members through its range in the initial movement of said element away from said idle position, and a connection between said element and the other of said members having lost motion therein corresponding in extent to the range of movement of said first member whereby said first and second members are moved through their respective ranges successively in the movement of said element away from its low speed position.

9. A speed regulator of the character described having, in combination, a power actuated servo having a movable driven part adapted for connection with the energy controller of a prime mover, two speed governors adapted to be driven from individual sources of rotary power and each having an adjusting member movable selectively to different positions within a given range to vary the speed setting of the associated governor, control devices actuated by the respective governors and acting jointly to control the energization of said servo and thereby vary the position of said driven part, a single manually movable element selectively movable through a range corresponding to the combined ranges of movement of said two adjusting members, and connections between said element and said adjusting members and operable in the movement of the element through said combined range to move one of said members through its adjusting range in the speed-increasing direction and then move the other adjusting member in the continued movement of the element to increase the speed setting of the other governor.

10. The combination of, a power driven shaft, a second shaft driven from said first shaft through a variable speed transmission, a fluid pressure servo having a movable driven element, two control devices interconnected in series relation and coacting jointly to regulate the energization of said servo and thereby variably position said element, a speed senser for actuating one of said control devices connected to and driven by said first shaft and having a selectively movable speed adjusting member, a second speed senser for actuating the other of said control devices connected to and driven by said second shaft and having a selectively movable speed adjusting member, and connections between said servo element and each of said speed adjusting members and operable to transmit the movements of the servo element to each of said members to increase and decrease the speed settings thereof progressively with the speed-decreasing and speed-increasing movements respectively of the servo element.

11. The combination of, a power driven shaft, a second shaft driven from said first shaft through a variable speed transmission, a fluid pressure servo having a movable driven element, two control devices coacting jointly to control the energization of said servo and thereby variably position said element according to the combined positions of the two devices, a speed senser for actuating one of said control devices connected to and driven by said first shaft and having a selectively movable speed adjusting member, a second speed senser for actuating the other of said control devices connected to and driven by said second shaft and having a selectively movable speed adjusting member, and a manually movable adjusting device movable in one direction away from an idle position to first increase the speed setting of said first speed senser progressively to a predetermined value and then, in the continued movement of the member, to increase the speed setting of the other speed senser.

GEORGE E. PARKER.

References Cited in the file of this patent

UNITED STATES PATENTS

| Number | Name | Date |
|---|---|---|
| 2,324,514 | Kalin | July 20, 1943 |
| 2,344,308 | Kalin | Mar. 14, 1944 |
| 2,499,128 | Brunken | Feb. 28, 1950 |
| 2,503,362 | Sweet | Apr. 11, 1950 |
| 2,602,655 | Gesner | July 8, 1952 |